US012585122B1

(12) United States Patent

Xu et al.

(10) Patent No.:     US 12,585,122 B1

(45) Date of Patent:     Mar. 24, 2026

(54) VIRTUAL REALITY SYSTEM WITH INTEGRATED OPTICAL PASS-THROUGH USING META-LENS

(71) Applicant: Adeia Imaging LLC, San Jose, CA (US)

(72) Inventors: Ning Xu, Irvine, CA (US); Jean-Yves Couleaud, Mission Viejo, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/895,667

(22) Filed: Sep. 25, 2024

(51) Int. Cl.
| | |
|---|---|
| *G02F 1/01* | (2006.01) |
| *G02B 27/01* | (2006.01) |
| *G02F 1/137* | (2006.01) |
| *G06F 1/16* | (2006.01) |
| *G02B 3/08* | (2006.01) |

(52) U.S. Cl.
CPC ....... *G02B 27/0172* (2013.01); *G02F 1/0136* (2013.01); *G02F 1/137* (2013.01); *G02B 3/08* (2013.01); *G02B 2027/014* (2013.01)

(58) Field of Classification Search
CPC ....................................................... G06F 3/011
See application file for complete search history.

(56) References Cited

U.S. PATENT DOCUMENTS

| | | | | |
|---|---|---|---|---|
| 2011/0170105 A1* | 7/2011 | Cui | ........................ | G02B 21/33 |
| | | | | 356/450 |
| 2016/0313790 A1* | 10/2016 | Clement | ............ | G02B 27/0093 |
| 2018/0267575 A1* | 9/2018 | Sullivan | ................. | G02B 26/02 |
| 2020/0089027 A1* | 3/2020 | Park | ................... | G02B 27/0176 |
| 2020/0266252 A1* | 8/2020 | Cancel Olmo | ....... | G06F 1/1686 |
| 2022/0382064 A1* | 12/2022 | Rohn | ..................... | G02B 1/002 |

OTHER PUBLICATIONS

Anonymous, "LUMINEQ transparent micro displays for optical devices", available online at: <https://www.lumineq.com/transparent-micro-displays>, retrieved on Sep. 29, 2024 (8 pages).

Anonymous, "MetaOptic Designer Product Overview", Synopsys (Registered), available online at: <https://www.synopsys.com/photonic-solutions/rsoft-photonic-device-tools/metaoptic-designer.html>, retrieved on Sep. 29, 2024 (6 pages).

Blate, et al., "Implementation and Evaluation of a 50 KHz, 28us Motion-to-Pose Latency Head Tracking Instrument", IEEE Transactions on Visualization and Computer Graphics, 25(5):1970-1980 (2019).

(Continued)

*Primary Examiner* — Nan-Ying Yang
(74) *Attorney, Agent, or Firm* — HG LAW LLP

(57)     ABSTRACT

Methods, systems, and devices are described herein for providing an extended reality (XR) experience capable of both augmented reality (AR) and virtual reality (VR) functions. The XR device comprises transparent components enabling optical see-through (OST); the device comprising a transparent microLED display and a transparent image sensor together with a meta-lens. The XR OST device can switch between a fully immersive VR mode and an AR mode by controlling the display's transparency. Light from the exterior real-world scene is collected by the meta-lens on a wide field of view (FOV) and focused onto the transparent image sensor to detect objects in the real-world environment.

19 Claims, 9 Drawing Sheets

(56)     References Cited

OTHER PUBLICATIONS

Halfacree, "Meta's Light-Field Pass-Through System Aims to Make VR Headsets Turn Transparent On-Demand", hackster.io, available online at: <https://www.hackster.io/news/meta-s-light-field-pass-through-system-aims-to-make-vr-headsets-turn-transparent-on-demand-840b9dcbe88c>, retrieved on Sep. 29, 2024 (3 pages).

Katzmaier, et al., "Samsung's New Transparent Micro-LED Boosts Picture Quality of See-Through Screens", CNET, available online at: <https://www.cnet.com/tech/home-entertainment/samsung-new-transparent-micro-led-boosts-picture-quality-of-see-through-screens/>, retrieved on Sep. 29, 2014 (14 pages).

Khorasaninejad, et al., "Metalenses: Versatile multifunctional photonic components", Science, vol. 358, No. 6367, Oct. 5, 2017 (10 pages).

Lien, et al., "Ranging and light field imaging with transparent photodetectors", nature photonics, 14:143-148 (2020).

Mitchell, "Transparent Image Sensors: The Future with Graphene & Quantum Dots", available online at: <https://www.electropages.com/blog/2023/09/researchers-create-transparent-image-sensor>, Sep. 20, 2023 (4 pages).

Optofidelity, "Apple Vision Pro Benchmark Test 1: See-Through Latency, Photon-to-Photon", available online at: <https://www.optofidelity.com/insights/blogs/apple-vision-pro-benchmark-test-1-see-through-latency-photon-to-photon>, Feb. 14, 2024 (6 pages).

U.S. Appl. No. 18/641,760, filed Apr. 22, 2024, entitled "Hhybrid Viewfinder With Transparent Imaging Sensor," Inventor Ning Xu.

U.S. Appl. No. 18/757,864 , filed Jun. 6, 2024, entitled "Image Sensor With Multi-State Tunable Color Filter," Inventor Ning Xu et al.

U.S. Appl. No. 18/757,873, filed Jun. 6, 2024, entitled "Image Sensor With Stacked Color Filters," Inventor Ning Xu et al.

Wikipedia, "See-through display", available online at: < https://en.wikipedia.org/wiki/See-through_display>, Sep. 29, 2024 (5 pages).

Yang, "Achromatic and Wide Field-of-View Metalens Design", B.S., Peking University (2019); Submitted to Department of Materials Science and Engingeering on Jan. 15, 2021 (50 pages).

* cited by examiner

101

107

110

170

180

114

112

106    108

103

101

106

108

103

114

External emitter system 217
coupled to external sensor
system 218

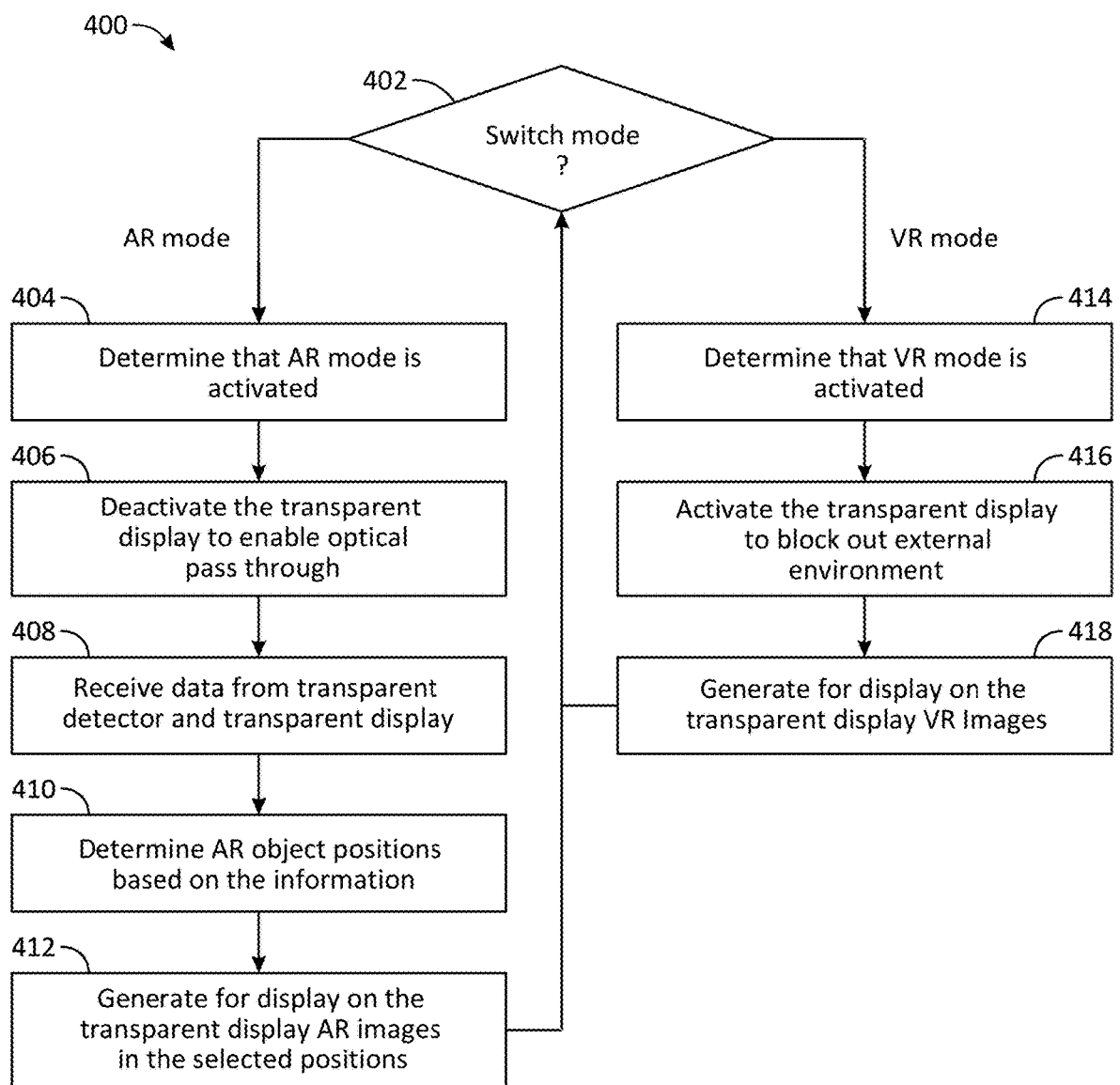

400

402

Switch mode
?

AR mode

VR mode

404

Determine that AR mode is
activated

406

Deactivate the transparent
display to enable optical
pass through

408

Receive data from transparent
detector and transparent display

410

Determine AR object positions
based on the information

412

Generate for display on the
transparent display AR images
in the selected positions

414

Determine that VR mode is
activated

416

Activate the transparent display
to block out external
environment

418

Generate for display on the
transparent display VR Images

FIG. 4

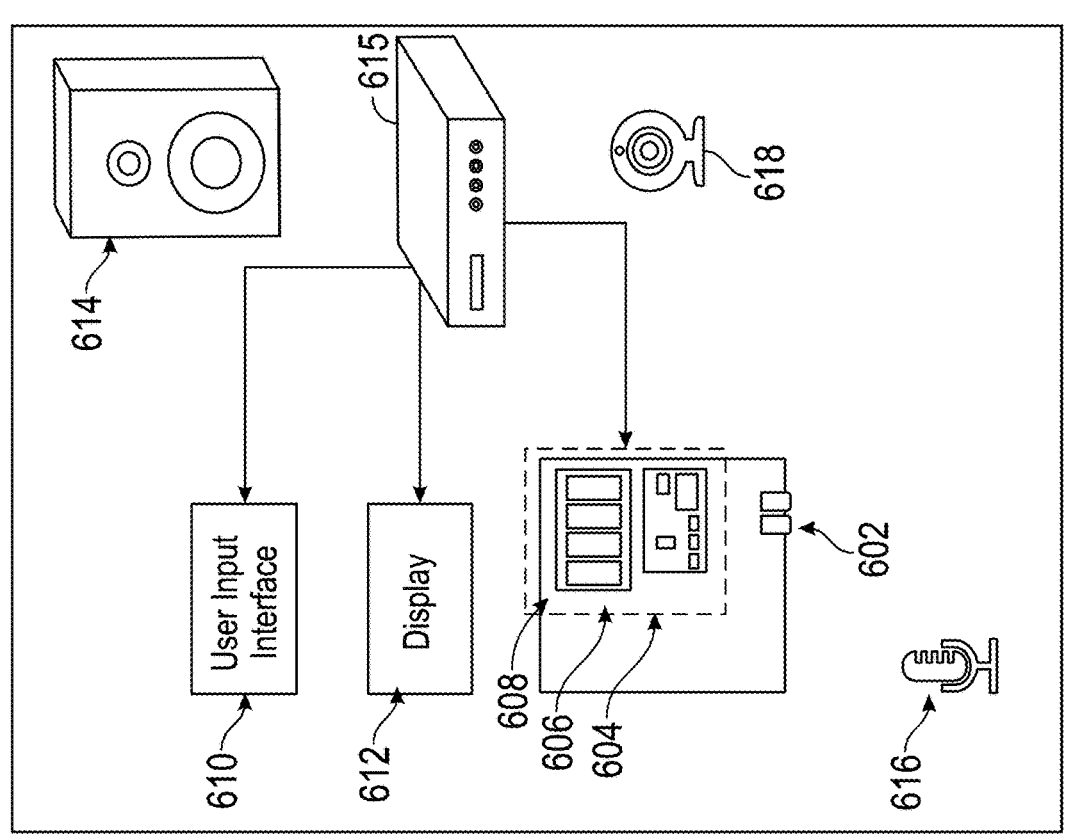
601
615
614
618
User Input Interface
Display
610
612
608
606
604
602
616
FIG. 6
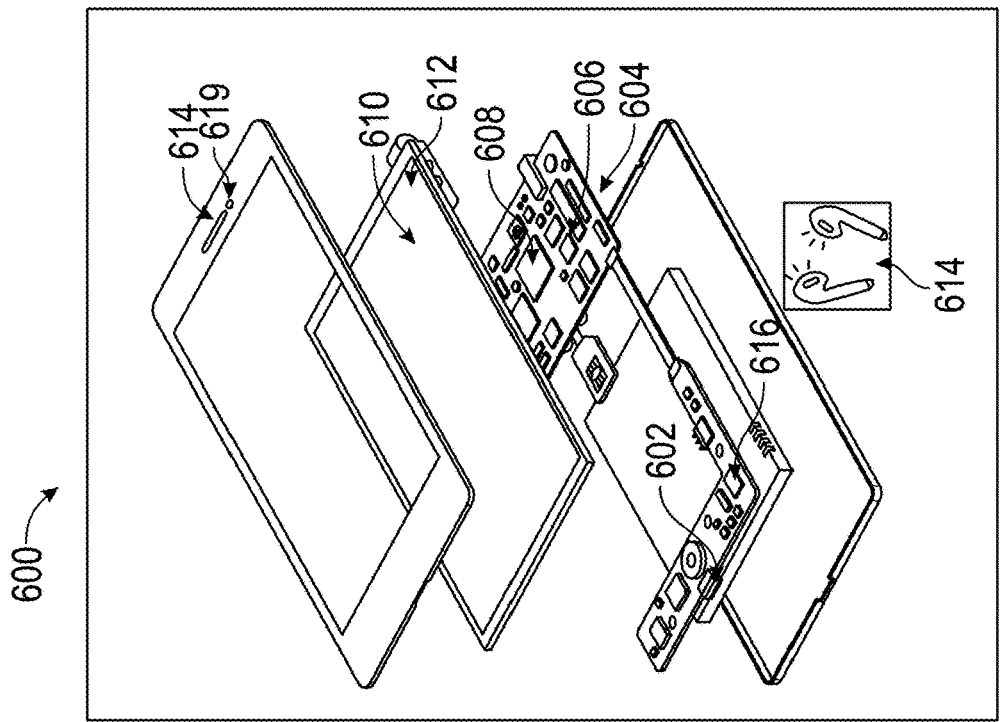
600
614
619
610
612
608
606
604
614
602
616

VIRTUAL REALITY SYSTEM WITH INTEGRATED OPTICAL PASS-THROUGH USING META-LENS

BACKGROUND

The present disclosure relates to an optical see-through (OST) display system comprising electrical and optical components that provide extended reality (XR) experiences for virtual reality (VR), augmented reality (AR) and mixed reality (MR) described herein. The disclosure further relates to XR OST systems with a meta-lens.

SUMMARY

There is a growing demand for XR systems to provide accurate display images of a real-world environment with low latency and distortion. In one approach, video see-through (VST) XR systems rely on cameras placed on a front face of a VST XR device (such as a head-mounted device or HMD) to capture real-world images that are then digitized and displayed, on an eye-proximate display, to create a digital representation of the surrounding, real-world environment. VST systems do not provide the user direct viewing of the real world and comprise opaque elements, meaning that the user is reliant on the imaging system of the XR device (e.g., cameras communicatively coupled to a display) to see a representation of the surrounding environment. In some embodiments, placing at least one or more cameras on exterior faces of a VST XR device allows for the XR system to collect enough spatial information to generate for display the surrounding environment meant to provide safe usage of the eye proximate device. In some approaches, the XR system provides for safe operation of the system by generating for display enough information to help the user avoid bumping into objects that they cannot otherwise see while wearing or using the XR system.

However, such reliance by the VST XR system on cameras introduces latency and inaccuracies to the digitally displayed representation of the surrounding environment. For instance, "photon-to-photon" or "capture-to-display" latency can be caused by the additional time needed to capture images (or video) of the environment and process the images for display on the device.

Further, noticeable visual inaccuracies may be introduced, in-part, because the position of the camera and the position of the eye and/or the eye-proximate display(s) do not match. In one approach inaccuracies in the system may be due to the position mismatches of the eye and the reprojected image, as the system attempts to reconstruct the 3D environment from image sensor data and reproject the reconstructed environment onto the display, the image on the display may not align to the user's eye. In another approach, the mismatch in position (e.g., optical centers of the eye and camera) may impart psychological or physiological duress on the user (e.g., motion sickness or simulator sickness). In another example, the field of view (FOV) of the camera on the XR device does not provide the same FOV nor resolution as the eye, and similar duress may be experienced as noted above. These issues imparted by VST systems cause a relay mismatch between the brain and the eye, resulting in discomfort, visual disorientation, and potentially leading to temporary visual blanks or blackouts, further exacerbating the user's overall experience of discomfort and unease. Therefore, there is a clear need for an XR system that better aligns with the user's eye, offering a more accurate and seamless view with minimal mismatch, a wider field of view, and higher resolution.

In another approach, an XR device may comprise elements that are fully transparent and don't utilize camera and display systems to capture and provide a digital display of the real-world environment to a user. However, such XR devices may comprise complex optical systems that require expensive and bulky optical components configured to project and overlay virtual elements on the real-world environment. These devices, typically, do not provide high-resolution, wide FOV or high dynamic range (HDR) images when compared to devices utilizing electronic displays. Additionally, these XR devices are typically configured as AR devices only and do not have VR functionality. Described herein is a device that produces both VR (similar to the VR provided by a VST device) and AR.

The present disclosure provides various designs of an OST XR system, where in some embodiments the OST XR system comprises a meta-lens, a transparent imaging sensor, and a transparent display (e.g., microLED display). This system provides accurate images, higher image quality, and reduced latency while being able to toggle between an AR mode and a VR mode because the microLED display provides highly accurate images without distortion, and the transparent sensor, configured to be in the line of sight of the user, allows for low latency object sensing/detection near to the eyes of the user. The transparent microLED display provides accurate images with fine resolution per pixel pitch, which is particularly beneficial for a near-eye display (NED). The configuration of the transparent detector and a meta-lens allows for the user to completely see-through the device while simultaneously allowing for the collecting of positional data of the environment surrounding the XR device.

The XR device can switch between fully immersive VR mode and an AR mode by controlling the display's transparency, thereby helping to address latency and image distortion issues in other VST VR systems. In some embodiments, transparency is disabled by an optical element that is disposed between the transparent display and the transparent detector, and that is capable of reducing its transparency until opaque. A wide-angle FOV is projected onto the transparent image sensor through a specially configured meta-lens, eliminating the need for bulky lens assemblies and re-projection, thus helping to reduce or minimize distortion. Switching between immersive and optical see-through (OST) provides the user additional safety measures while using the XR device as compared to video see-through (VST) systems. For example, the XR device may automatically switch (or turn off) to a transparent mode in response to a determined safety concern, such as detecting a moving object or hazard approaching.

While in VR mode, transparency is reduced, allowing the device to fully immerse the user in a virtual setting. The device while in VR mode may overlay real world, detected, objects with virtual elements by collecting positional information of the environment surrounding the device. In some embodiments, an external camera system collects images which are subsequently sent to an image processor to detect objects in real time. In some embodiments, an external emitter (e.g., infrared laser) may be configured with the meta-lens and the transparent detector to collect positional data from the surrounding environment. Control circuitry communicatively couples the transparent detector to the display to generate a VR overlay on detected elements producing virtual VST content.

While in AR mode, transparency is not reduced. By creating a transparent stack of optical elements, from the observer plane to the environment, the transparent display, transparent detector and meta-lens allow the user to directly observe the real-world environment. The detector in AR mode may be used to collect positional data of elements surrounding the user to place AR objects. The stack of transparent optical elements allows for a reduction of latency and distortion. By aligning the projection center with the eye and using direct light capture through transparent components, this system effectively reduces image distortion and latency seen in other XR systems.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 is a flowchart of a process for a near-eye XR system, for switching between AR and VR modes, in accordance with some embodiments of this disclosure.

FIG. 6 depicts an illustrative user equipment device, in accordance with some embodiments of this disclosure.

Figures 1A, 1B:
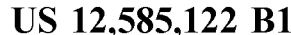
FIG. 1A depicts a rendering of an example near-eye XR device, in accordance with some embodiments of this disclosure.
FIG. 1B depicts a cross-sectional schematic view of an example near-eye XR device, related to FIG. 1A, in accordance with some embodiments of this disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION OF THE DRAWINGS

Embodiments herein provide for an OST device with dual-mode XR having a VR mode and an AR mode. Modern computing and display technologies have facilitated the development of XR systems for so called "virtual reality" or "augmented reality" experiences, wherein digitally reproduced images or portions thereof are presented to a user in a manner wherein they seem to be, or may be perceived as, real. A virtual reality, or "VR," scenario may involve presentation of digital or virtual image information without transparency to other actual real-world visual input. When transparency is reduced on the device, there may be no real-world visibility to the user's eye so that the user may experience full VR games and experiences (e.g., games, virtual world experiences, metaverse, movies or shows, etc.) An augmented reality (AR), scenario may involve presentation of digital or virtual image information as an augmentation to visualization of the actual world around the user. For example, referring to FIG. 2A, an AR scene is depicted in which the system will allow for observation of real-world setting 216 featuring trees and hills in the background. In addition to these real-world elements, the user may perceive a Pokémon™ 204 (e.g., Jigglypuff) standing in the real-world background 216.

The OST device in some embodiments includes a display, capable of disabling transparency. Disabling transparency may allow the OST device to block, completely or partially, incident light from the environment to the user's eyes, thereby allowing for a display to fully immerse the observer in VR.

The XR device includes transparent optical elements (e.g., meta-lens, detector, display), which are configured to allow the user to observe the real environment, and to display an overlay (e.g., digital information overlay, virtual objects), which enables OST in an AR mode. The AR mode of the OST device provides real-time viewing without delay. The AR mode also provides a what-you-see-is-what-you-get (WYSIWYG) experience without a relatively bulky configuration.

In another example, XR may be viewed to be on a virtuality continuum, meaning that XR may be understood as a spectrum of immersion. One end of the spectrum may be understood as "low immersion" (e.g., real environment) and the other end may be understood as "high immersion" (e.g., virtual environment); e.g., as demonstrated by Milgram-Kishino's 1994 continuum. XR may be understood as an umbrella term for any technology that alters reality by adding digital elements to a real-world environment. VR may be understood as a full immersion into the virtual realm, disabling any or all direct imaging (e.g., OST) of the environment and overlaying it completely with digital information. AR and augmented virtuality (AV) may be understood as points on the spectrum of immersion between 0="low immersion" (e.g., real environment) and 1="high immersion" (e.g., virtual environment).

In some embodiments, the OST device provides an ability to switch between VR and AR modes while also providing a true real-time optical experience with real-time digital overlays. For example, the XR OST device delivers the VR and AR viewing mechanisms within a single, user-friendly interface and as part of a compact, XR OST system. In some embodiments, switching to AR mode provides a plurality of AR mode options.

The XR OST device includes a transparent imaging sensor (e.g., transparent detector) in some embodiments. The transparent imaging sensor captures and converts light into one or more electrical signals without obstructing one or more optical viewing paths. The transparent imaging sensor enhances design and functionality of the OST device. The transparent imaging sensor captures 3D and/or multi-focalplane imaging information using, e.g., a plurality of layered transparent sensors, for example. The plurality of transparent imaging sensors allow light to pass through each layer with a pass-through rate of about 97%, for example. Additional applications for transparent image sensors are provided. The transparent imaging sensor includes graphene, for example. The transparent imaging sensor includes, for example, other transparent materials. The XR OST device provides for both AR and VR modes without significant trade-offs.

The XR OST device includes control circuitry configured to perform one or more of the above-referenced features. Further provided is a device equipped with means for performing one or more of the above-referenced features. Still further provided is a non-transitory, computer-readable medium with instructions that, when executed, perform one or more of the above-referenced features. Related processes, subprocesses, apparatuses, devices, techniques, and articles are also provided.

The present disclosure is not limited to the combination of the elements as listed herein and may be assembled in any combination of the elements described herein. These and other capabilities of the disclosed subject matter will be more fully understood after a review of the following figures, further detailed description, and claims.

FIG. 1A illustrates a rendering of a user wearing a head mounted XR OST device 101. In some embodiments, the XR OST device 101 comprises at least a meta-lens 114, a transparent image sensor 108, and a transparent display 106 within an enclosure 103 (e.g., opaque enclosure such as plastic, metal, cardboard, etc.). In some embodiments, the enclosure 103 comprises a first opening 170 and a second opening 180. For example, the enclosure (e.g., housing), in some embodiments, comprises one large first opening 170 and one large second opening 170, allowing both user's eyes to see through. In some instances, the first opening and second opening each comprise two respective openings. In some embodiments, the enclosure 103 is not a complete enclosure but a bezel that borders and holds the components in a display stack.

FIG. 1B schematically illustrates an example cross-section of the example XR OST device 101 from FIG. 1A. In some embodiments, the entire structure illustrated in FIG. 1B may be disposed over each of the user's eye. The XR OST device 101 further comprises an entrance aperture 110 (e.g., eyepiece). In some embodiments, the entrance aperture 110 is coplanar with the enclosure 103. In some embodiments, the aperture 110 protrudes outwardly or away from the enclosure 103. In other embodiments, the aperture 110 is recessed in the enclosure 103.

In some embodiments, as illustrated in FIG. 1B, the enclosure 103 of the XR OST device 101 comprises a meta-lens 114 disposed within an aperture 112. In some embodiments, the meta-lens 114 is held in place by the aperture 112 with adhesives (e.g., structural adhesives, elastomers, cyanoacrylates). In some embodiments, the meta-lens is held in place by the aperture 112 mechanically (e.g., snap ring, retaining ring, clamp, retaining ring). The meta-lens 114 generally uses nanostructures configured to refract light at a wide FOV, allowing it to collect a larger sampling of data. In some embodiments, the meta-lens 114 is aligned to the optic center of the viewer's eye position (e.g., eye box, point, or plane). In some embodiments, the XR device comprises a mechanism that allows a user to adjust the position of the meta-lens 114 (e.g., up/down and or in/out). In some embodiments, the position of the meta-lens is fixed and the XR device comprises a mechanism that allows a user to adjust the position of the first 170 and second 180 apertures. As illustrated in the example, the meta-lens 114 with the aperture 112 is disposed or recessed within the enclosure 103, the enclosure having an opening 180 (e.g., second aperture). In some embodiments, the meta-lens 114 and aperture 112 are coplanar to the exterior surface of the enclosure 103, and in other embodiments may protrude out of the enclosure 103.

The meta-lens 114, in some embodiments, may be a meta-sheet that comprises a flat substrate (e.g., optical material, oxide, dielectric), and which flat substrate comprises a plurality of nanostructures (e.g., columns, triangles, polygons). The surface of the meta-lens 114 embedded with nanostructures in some embodiments is configured to control the phase, amplitude, and direction of incident light. The nanostructures on the meta-lens 114 are designed to refract and bend light from a wide angle, focusing incident light on the transparent imaging sensor 108. In some embodiments, as illustrated in FIG. 1A, two meta-lenses 114, are disposed over the eye position, one for each eye. In other embodiments, the meta-lens 114 is one large structure (e.g., a meta-lens sheet). In some embodiments, optical components (e.g., a second meta-lens, other lens structures, polarizers, diffusers, micro lens arrays, etc.) are disposed between the meta-lens 114 and the imaging sensor 108.

In some embodiments, the meta-lens 114 captures light from the environment, in a wide-angle FOV, and focused onto the transparent imaging sensor 108. The transparent imaging sensor 108 captures real-world images while allowing light to pass though and maintaining an unobstructed view for the user. For example, the transparent imaging sensor 108 is a transparent graphene photodetector stack (e.g., all-graphene layer embedded in a transparent substrate).

In some embodiments, the transparent detector 108 is a photodetector comprising graphene, a conducting channel layer, and a gate layer. The conducting channel layer and gate layer are interconnected with the graphene, enabling sensitive light detection while maintaining a high percentage of transparency. In some embodiments, the transparent detector 108 comprises a transparent glass substrate with a plurality of graphene layers coupled to a source and drain. Disposed between the graphene layers is a 40-nm thick layer comprising $Al_2O_3$ and a 6 nm layer of $Ta_2O_5$. The transparent imaging detector 108 in some embodiments is a plurality of stacked transparent imaging detectors capable of depth ranging. In some embodiments, the imaging sensor is communicatively coupled with control circuitry and a server to analyze data capable of computational reconstruction of a 4D light field. For example, the term "4D" refers to the four dimensions of the light field (e.g., two spatial dimensions x, y, and two angular dimensions $\theta$, $\varphi$. The reconstruction of a light field may require additional detectors to determine the position, intensity and direction of incident light in the environment. An example of the thickness of the imaging sensor may be 200 microns. In some embodiments, the transparent detector 108 comprises quantum dot structures for photodetection of the incident light.

Figure 7:
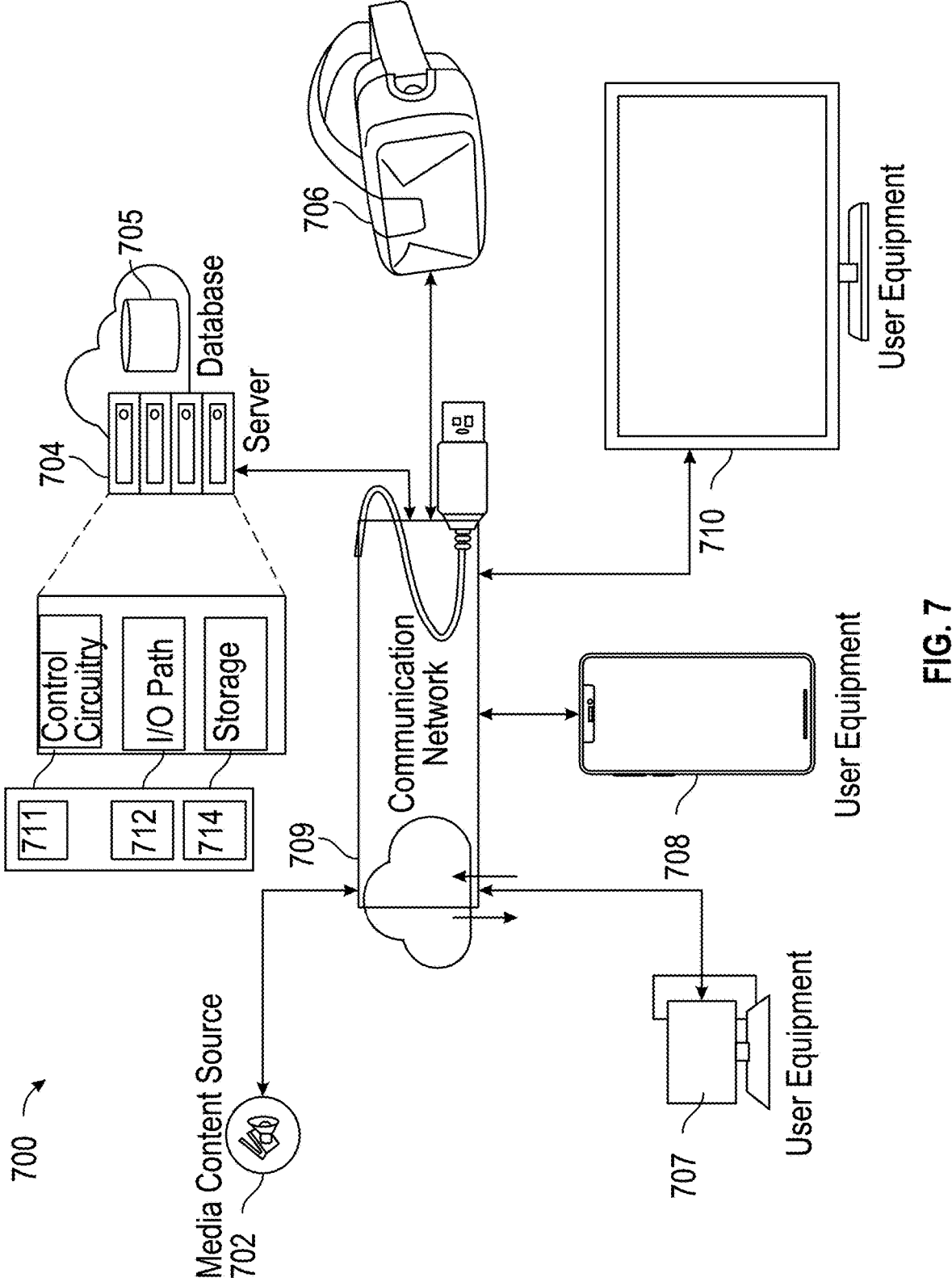
FIG. 7 depicts an illustrative user equipment system, in accordance with some embodiments of this disclosure.
Figure 8:
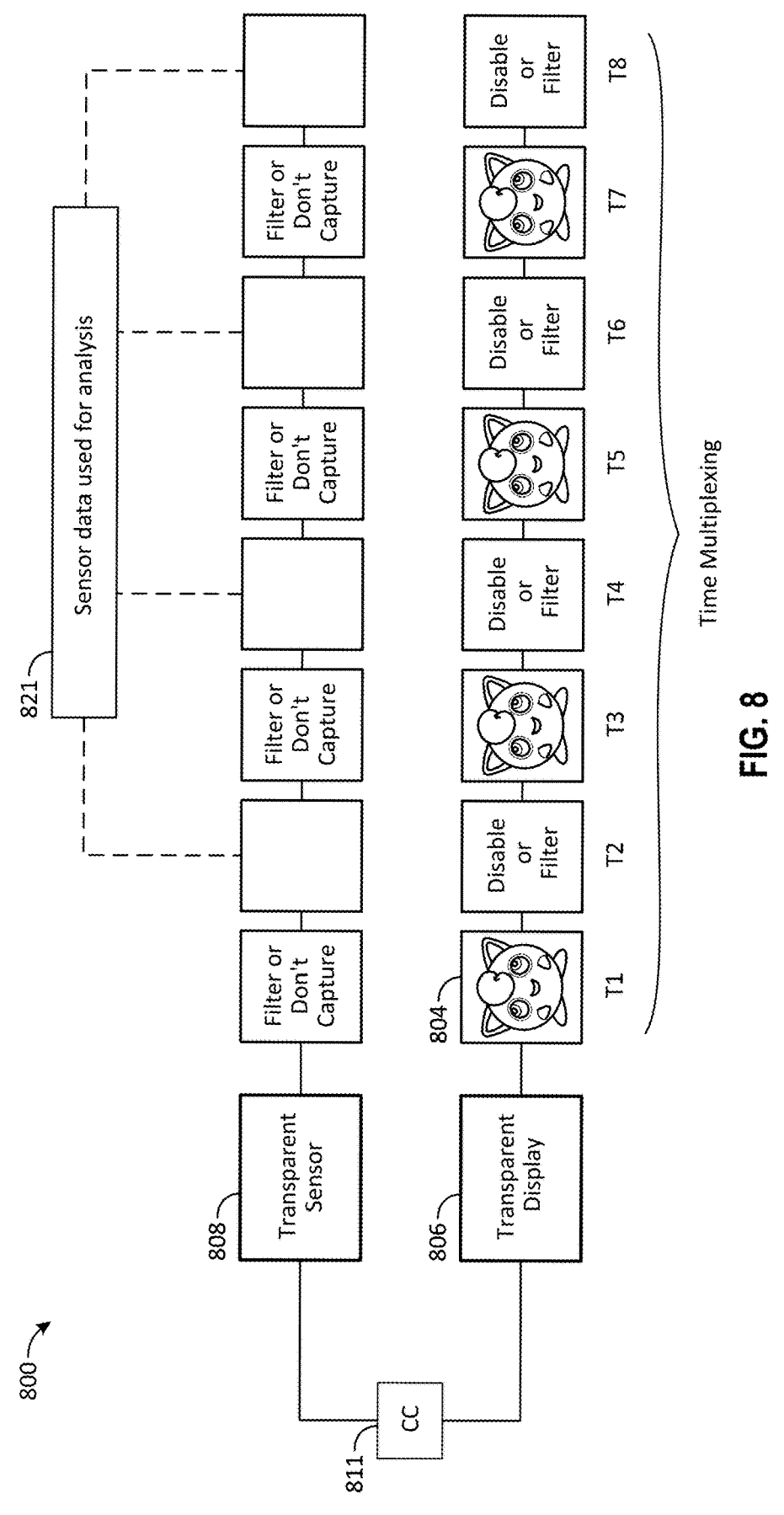
FIG. 8 depicts a schematic of an XR system utilizing a time multiplex scheme, in accordance with some embodiments of this disclosure.

Continuing the example illustrated in FIG. 1B, the transparent image detector is communicatively coupled to the display 106 through input/output control circuitry (e.g., 215, 217 of FIG. 2, 604 of FIG. 6, 711 of FIG. 7, 811 of FIG. 8, etc.). The transparent display 106 in some embodiment is a microLED display. The transparent imaging sensor 108, captures the focused light produced by the meta-lens 114, converting it into electrical signals while maintaining transparency to allow the user to see through the display. In some embodiments the processed image is then projected onto the transparent microLED display 106, capable of switching between opaque and transparent modes. In some embodiments, the transparent imaging sensor 108 captures positional information of the surrounding real-world environment for the microLED display 106 to generate for display virtual images over the real-world environment. For example, the transparent imaging sensor 108 receives information that correlates to an immovable object (e.g., a tree), subsequent to detecting the immovable object, the system may place virtual objects, in determined space of the immovable object, to prevent the user from harming themselves on the object (e.g., bumping into the tree).

A display 106 in some embodiments is an LED display (e.g., a microLED display). A microLED display in some embodiments comprises pixels with its sides less than about 100 microns, less than about 50 microns, or less than about 5 microns in size. The pixel size may depend on application. For example, an XR display (e.g., VR, AR, or MR display or any suitable combination) may have a pixel size of about 5 microns or under. In some embodiments, a pixel includes multiple sub-pixels or LEDs. For example, a pixel includes three sub-pixels comprising a red LED, a blue LED, and a green LED. As another example, a pixel includes four sub-pixels comprising a red LED, a blue LED, and two green LEDs. In some embodiments, a pixel comprises any suitable number of sub-pixels or LEDs (e.g., one, two, three or more LEDs).

In some embodiments, the transparent display 106 and the transparent detector 108 are electrically coupled to control circuitry and may be disposed in an opaque enclosure (e.g., 103). For example, the transparent detector captures images and sends associated electrical signal data to the control circuitry. The control circuitry analyzes the one or more electrical signals to determine localization of the real-world environment and objects 216. In some embodiments, the control circuitry may additionally utilize video object tracking, artificial intelligence (AI) image recognition, spatial sound and/or spatial haptic feedback, or any suitable object detection technique or combination thereof to determine location of the real-world environment and objects. For example, upon determining location of the real-world environment and objects, the control circuitry may generate for display AR or VR images on the transparent display. In some embodiments, the control circuitry controls the state, mode, or data of the transparent display 106 and the transparent detector 108. For example, transparent display is enabled in FIG. 2A (e.g., 206) and disabled in FIG. 3 (e.g., 306). For example, transparent display 806 and transparent sensor 808 of FIG. 8 are enabled, disabled, or their associated data is filtered by control circuitry 811. In some embodiments, control circuitry is used to change mode of the OST device from AR mode to VR mode or VR mode to AR mode (e.g., FIG. 4).

In some embodiments, the XR OST system comprises hardware and/or is in communication with hardware that executes an XR application. Such XR application may be executed at least in part on a server (e.g., media content source 702 and/or one or more servers 704 of FIG. 7), a user equipment device (e.g., OST Device 101 of FIG. 1B, devices 706, 707, 708, and/or 710 of FIG. 7, such as, for example, a laptop computer, a personal computer, a desktop computer, a smart television, a smart watch or wearable device, smart glasses, a stereoscopic display, a wearable camera, XR glasses, XR goggles, an XR HMD, a near-eye display device, etc.), or any other suitable user equipment or computing device, or any combination thereof. The XR application and/or system may comprise or employ any suitable number of displays, sensors, or devices such as those described herein, or any other suitable software and/or hardware components, or any combination thereof.

Figure 2A:
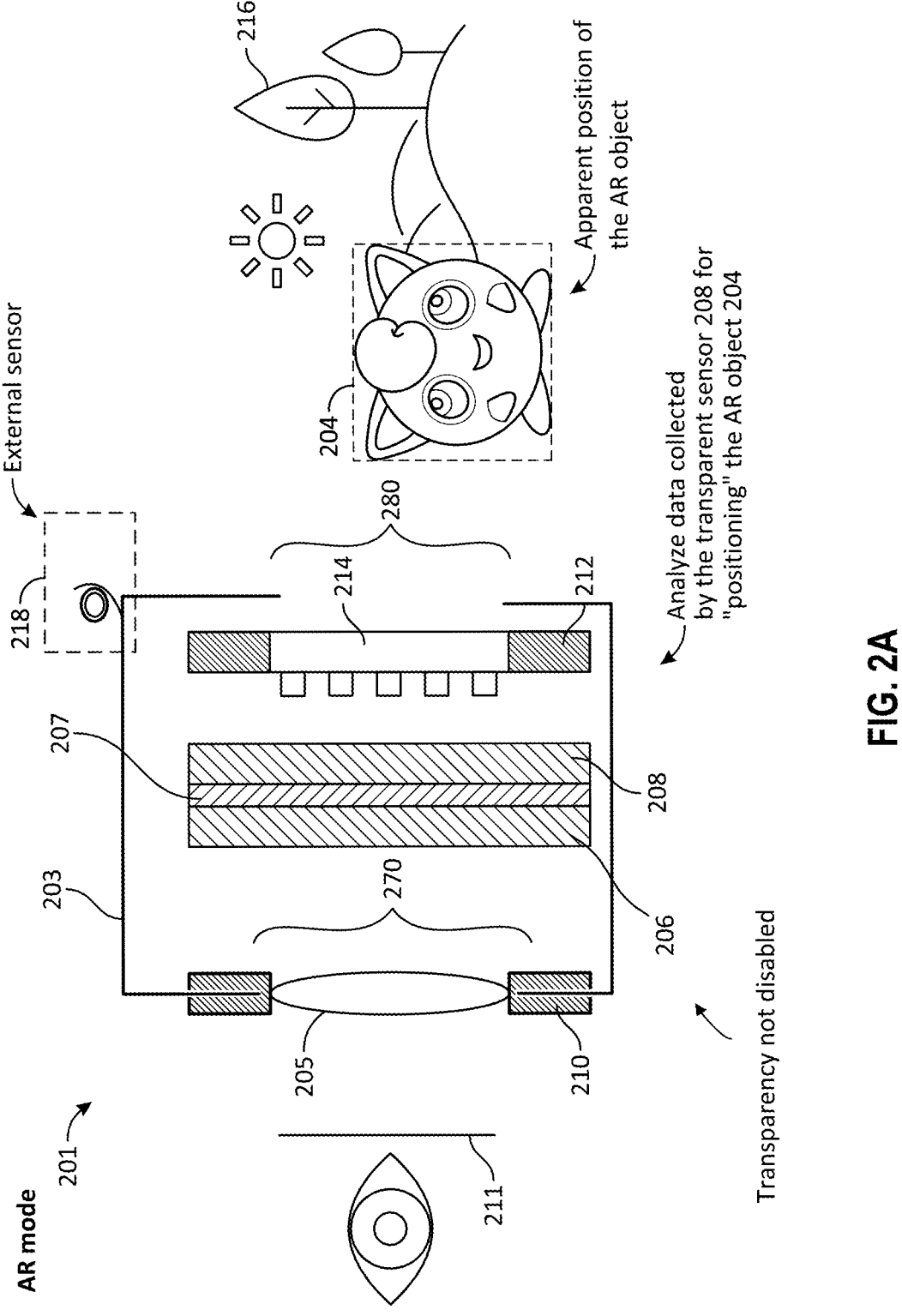
FIG. 2A depicts a schematic of a near-eye XR device, in an AR mode, in accordance with some embodiments of this disclosure.

FIG. 2A schematically illustrates components of an XR OST device 201 in AR mode. In some embodiments, the components in FIG. 2A relate to the components illustrated in FIG. 1B. In some embodiments, the XR OST system utilizes control circuitry (e.g., 217, 215, 604, 711, 811, etc.) to switch between AR and VR modes 402, discussed below. AR mode may be understood as being fully or partially transparent, meaning that, the user 211 is able to see-through the components of the XR OST device 201 to observe the real-world environment 216. The XR OST device 201 comprises the same or similar elements described in FIGS. 1A-1B, such as a meta-lens 214 disposed in an enclosure 203, a transparent detector 208, a focus screen 207, and a transparent display 206. In some embodiments, the enclosure 203 comprises two openings, a first opening 270 near the eye 211 and a second opening 280 further from the eye 211. In some embodiments the XR OST device 201 further comprises an eyepiece lens 205 disposed in an aperture 110 configured to translate light produced by the display 206 to a user's eye 211 (e.g., eye box, observer plane, focal point). In some embodiments, the transparent image detector 208 collects light from the environment 216 that transmits through the second opening 280 (e.g., aperture) of the enclosure 103, and focused by the meta-lens 114. In some embodiments, the focus screen 207 is a part of the transparent image detector 208. In some embodiments, the focuses screen 207 comprises a transparent material (e.g., schott glass, ground glass, Fresnel lens). In some embodiments, the focus screen 207 allows the user to preview the image focused by the meta-lens 114. In some embodiments, the meta-lens comprises multiple focal lengths that image on both the transparent image detector 208 and focus screen 207.

The transparent detector 208, in some embodiments, converts light into electrical signals to be processed by either an internal computing processor unit (CPU) or sent to an external server, for data processing (e.g., cloud computation). The electrical signals are compressed to a dataset, which is analyzed to determine spatial distances and/or for object detection of the surrounding real-world environment 216. In some embodiments, the dataset collected from the transparent image sensor 208 is supplemented by additional data collected by an external sensor 218. In some embodiments, the external sensor 218 is one of a plurality of camera types (e.g., RGB, IR, time-of-flight, structured light, stereo, fisheye, monochrome, event-based, wavefront sensor). In other embodiments, the external sensor 218 is a plurality of external sensors 218 which comprises one or more camera types or combination thereof.

Data collected by the transparent detector 208 and/or the external sensor 218 is processed by a computational device (e.g., CPU), and such processing may be performed to identify positions to place AR elements. For example, external sensor 218 may be an event camera which detects events to outline a nearby tree from the real-world environment 216. The data the event camera produces when used in combination with the internal transparent detector 208 may reduce the positional error of detected real objection to less than 0.2 degrees. Continuing the example, the XR OST device 201 may be instructed, by a user interface device (e.g., application on a cellphone) to place an AR object near the tree (e.g., 1 degree away). The XR OST device 201 generates for display on a microLED display 206 an AR object 204 (e.g., Jigglypuff) perceived to be close to the tree. In AR mode the display 206 remains transparent and is controlled to overlay digital elements 204 onto the real-world view 216.

In an example, image processing to detect objects from the real-world environment 216 comprises collecting light on the transparent imaging sensor 208. For example, a detector 208 similar to an event camera may be used. The event camera collects light intensity differentials by events (e.g., movements, jitter) to compute movement differential and detect object outlines. These outlines may be used as tracked objects in the environment 216 (e.g., a tree) to place AR objects 204 (e.g., Jigglypuff). Pixels on the microLED display 206 may be correlated (e.g., by a correlation function) to data related to the tracked objects, and these tracked objects may comprise data points based in-part on the detected object outlines.

In another example, detecting objects from the real-world environment 216 comprises collecting light by the external sensor 218. The external sensor may comprise a wavefront sensor which collects amplitude and phase information from the surrounding environment 216. This may utilize additional optical elements (e.g., SLM, Fresnel Lens, Lenslet array, meta-lens, etc.,). The XR device 202 may comprise software capable of relating phase information to the distance of an object which the phase information relates to.

In some embodiments, the transparent display 206, the transparent detector 208, and the external sensor 218 are electrically coupled to control circuitry and may be disposed in an opaque enclosure (e.g., 203). For example, the transparent detector captures images and sends associated electrical signal data to the control circuitry. For example, the external sensor captures images or signals and sends associated electrical signal data to the control circuitry. The control circuitry analyzes the one or more electrical signals to determine localization of the real-world environment and objects 216. In some embodiments, the control circuitry may additionally utilize light detection and ranging (LiDAR), video object tracking, artificial intelligence (AI) image recognition, spatial sound and/or spatial haptic feedback, or any suitable object detection technique or combination thereof to determine localization of the real-world environment and objects. For example, upon determining localization of the real-world environment and objects, the control circuitry may generate for display AR or VR images on the transparent display (e.g., AR object 204).

In some embodiments, control circuitry may execute a time multiplex scheme to capture the scene while showing the optical see through. For example, during one portion of time, the optical see through and any AR object (e.g., 204, 804 or FIG. 8, etc.) is shown while the transparent display (e.g., 106 of FIG. 1, 206 of FIG. 2, 806 of FIG. 8, etc.) is transparent. During another portion of time, the control circuitry disables the transparency of the transparent display. These portions of time alternate to enable the transparent sensor (e.g., 108, 208, 308 of FIG. 3, 808, etc.) to convert light from the of real-world setting 216 into electrical signals without noise from the light emitted from the transparent display 206. More details on embodiments of a time multiplex scheme are provided in FIG. 8 and below.

In some embodiments, VR or AR objects 204 contain pre-canned animations that can be activated as needed. The pre-canned animations may be generated by the system, a third-party server, a third-party application, any other suitable animation generator, or any combination thereof. For example, the system may activate an animation of a Pokémon™ being capture in a Poké Ball™ based on receiving an indication that the virtual Poké Ball™ was thrown by the OST device user. In another example, the system may activate an animation of a Pokémon™ running away based on receiving an indication that the Pokémon™ was startled by an OST device user.

Figure 2B:
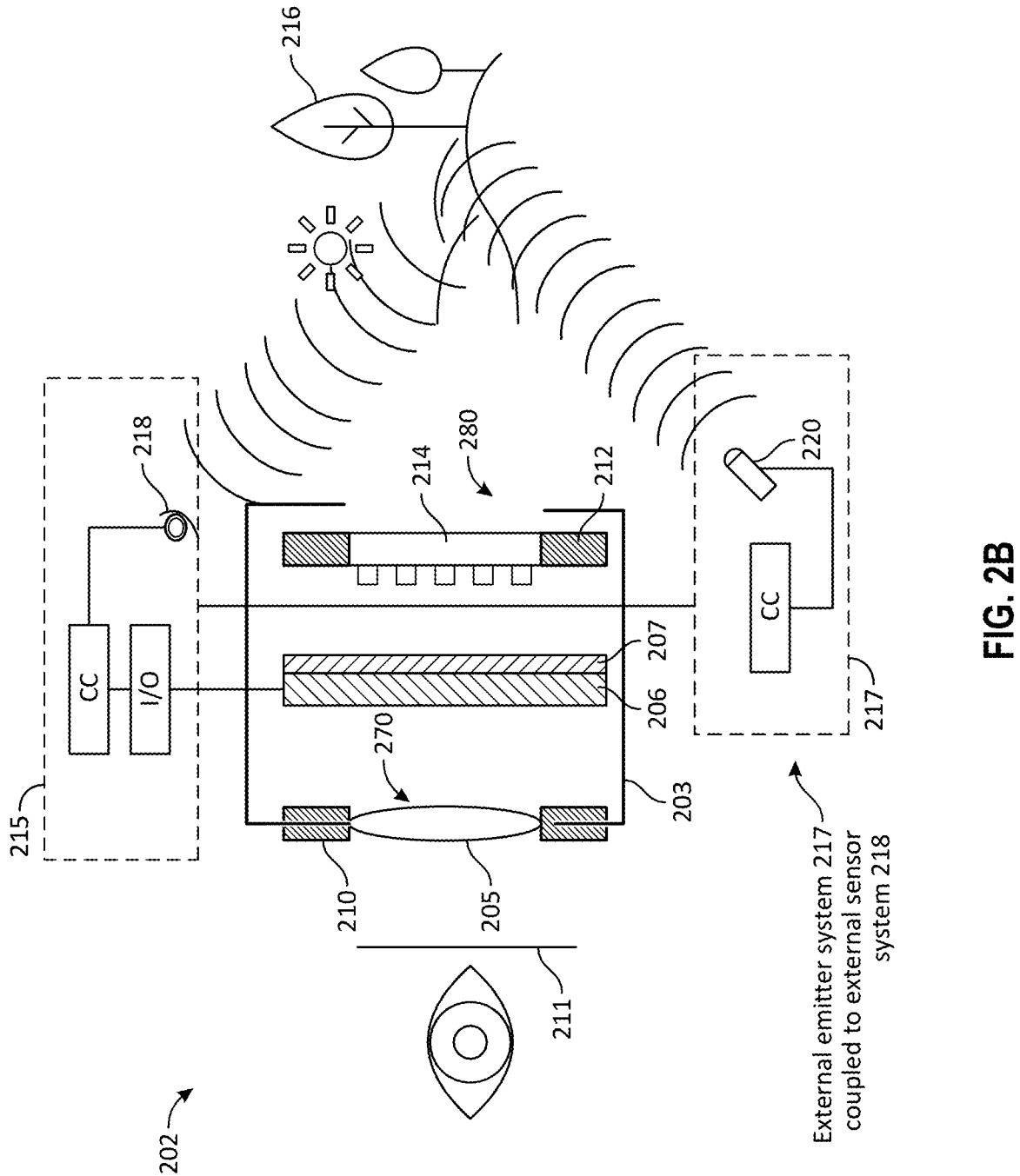
FIG. 2B depicts a schematic of a near-eye XR device comprising external sensors and an emitter system, in accordance with some embodiments of this disclosure.

FIG. 2B schematically illustrates components of an XR OST display device 202. The XR OST device 202 comprises similar components described in FIG. 2A, for example, a meta-lens 214 disposed in an enclosure 203, a focus screen 207, and a transparent display 206. In the example illustrated in FIG. 2B the transparent imaging sensor may not be used. The viewer 211 will still see the real-world scene 216 without reprojection induced distortion and latency. In this example, AR mode of the XR OST device 202 may utilize an external detector system (e.g., IR laser 220, IR camera 218) 215, 217 to capture the real-world scene 216 seen by the viewer 211 to detect locations on where to place AR objects. In some embodiments, the external detector system 215 comprises additional digital cameras.

In an embodiment, light from the real-world scene 216 is focused by the meta-lens 214 onto the focus screen 207. Both VR mode and AR mode may be enabled with the XR OST device 202 illustrated by FIG. 2B. In some embodiments, additional components are disposed between the transparent display 206 and the meta-lens 214 which are configured to reduce transparency of the optical system (e.g., liquid-crystal display (LCD) layer disposed between two polarization layers). In some embodiments, the transparent microLED display 206 contains optical elements known to reduce transparency.

In an embodiment, the external camera system(s) 218 captures the scene 216 for the purpose of scene analysis (e.g., image processing). The external camera 218 comprises a system of control circuitry 215 communicatively coupling the external camera 218 and the display 206. In some embodiments, the control circuitry 215 of the external camera 218 is coupled to the control circuitry 217 of the external laser system 220.

In some embodiments, the transparent display 206, the external sensor 218, and the external laser system 220 are electrically coupled to control circuitries (e.g., 215, 217, 604, 711, 811, etc.) and may be disposed in an opaque enclosure (e.g., 203). For example, I/O circuitry of control circuitry 217 controls the frequency at which the external laser 220 emits a laser light(s) towards real-world environment and objects 216. The laser light(s) is reflected by the objects in the environment and returned to the external sensor 218. For example, the external sensor captures the laser light signals and detects the time-of-flight (TOF), or duration of time that the laser light(s) traveled to and from the real-world objects 216. The external sensor 218 sends associated electrical signal data to the I/O circuitry of control circuitry 215. The control circuitry analyzes the one or more electrical signals to determine localization of the real-world environment and objects 216. In some embodiments, the control circuitry may additionally utilize transparent detector(s), video object tracking, artificial intelligence (AI) image recognition, spatial sound and/or spatial haptic feedback, or any suitable object detection technique or combination thereof to determine localization of the real-world environment and objects. For example, upon determining localization of the real-world environment and objects, the control circuitry my generate for display AR or VR images on the transparent display.

In one example, the external laser system 220 is a LiDAR emitter (e.g., 905 nm, 1550 nm, etc.), which sends out rapid pulses of laser light. The pulses emitted from the external laser system 220 travels through the air and hit objects in the real-world environment 216 (e.g., Velodyne HDL-64E emits pulses in 64 different directions to cover a wide field of view), meaning that the emitter may be singular or a plurality that emits in one direction or many directions. The pulses that hit objects in the real-world environment may reflect toward the external sensor 218. The sensor 218 (e.g., photodetector, avalanche photodiode (APD)) may collect the reflected signal and determine changes from the emitted signal. The system of the XR device 202 may then calculate the "time-of-flight" of the emitted signal. In one embodiment, the external emitter 220 may emit thousands to millions of pulses per second, covering up to the entire FOV. Each of the received laser pulses provides a distance measurement, (e.g., a point in a 3D virtual map). The distances are compiled into a point cloud, i.e., a set of data points in a 3D coordinate system. The point cloud may be used to create a virtual map overlay of the system device surroundings. In some embodiments, data from the point cloud are sent to the microLED display controller 215. The controller allows for the microLED display 206 to generate AR content (e.g., Jigglypuff) on data correlated to the point cloud data. For example, if the system identifies an object in the real-world environment (e.g., a tree), the system may overlay information about that object and correlate it to pixels on the microLED display 206 mapping points comprising the AR object (e.g., Jigglypuff) to points on the detected tree in real-world environment 216.

Figure 3:
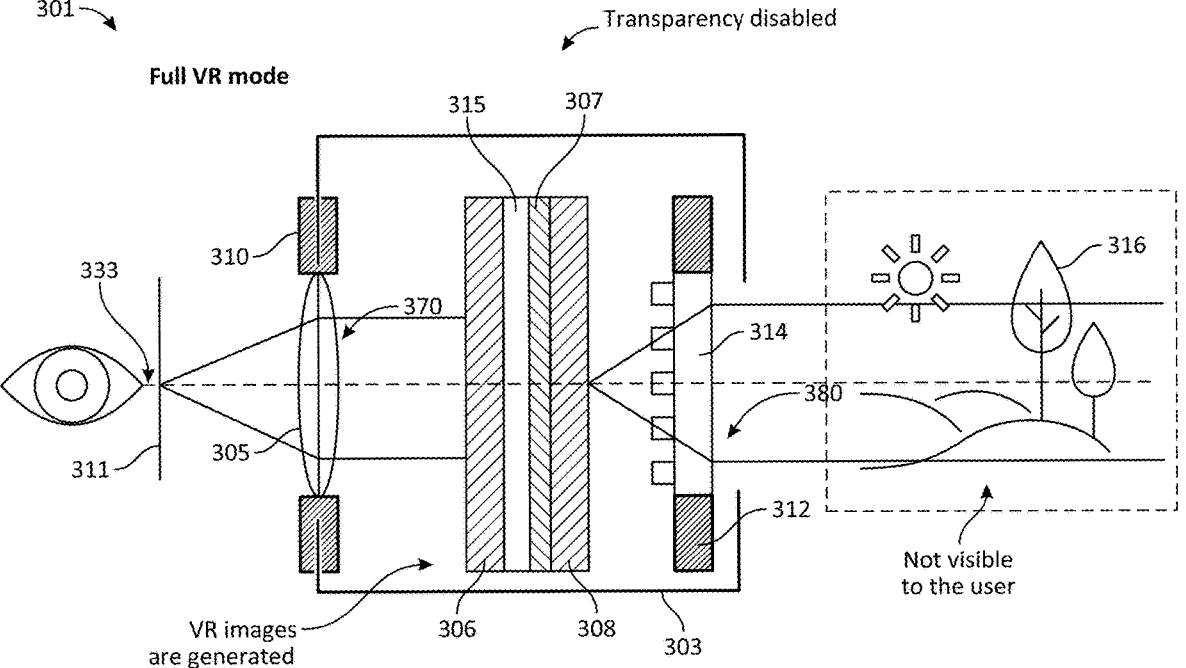
FIG. 3 depicts a schematic of a near-eye XR device in VR mode, in accordance with some embodiments of this disclosure.

FIG. 3 schematically illustrates a cross-section of an XR OST device 301 in VR mode. In some embodiments, the XR OST system utilizes control circuitry (e.g., 215, 217, 604, 711, 811, etc.) to switch between AR and VR modes 402, more details below. In an embodiment, VR mode controls the XR OST device 301 to be fully or partially opaque, meaning that, the user 311 is not able to see-through the XR OST device 301. The XR OST device 301 comprises similar components described in previous figures, for example, a meta-lens 314 disposed in an enclosure 303, a focus screen 307, an eyepiece 305, and a transparent display 306. The enclosure 303 comprises a first opening 370 and a second opening 380. In some embodiments, the XR OST device 301 comprises an optical element 315 disposed between microLED display 306 and the focus screen 307. In some embodiments, the optical element 315 comprises an LCD or other device capable of changing optical polarity disposed between two polarizers. In some embodiments, the LCD is communicatively coupled to an external control device (e.g., a user application on a mobile phone) to allow the manual control of the transparency of the system. In some embodiments, transparency (e.g., LCD screen) is controlled by an external luminance detector that automatically decreases transparency when the luminance of the environment is above a threshold, and vice versa, increases transparency when the luminance is below a threshold. In some embodiments, additional lenses may be inserted into the XR OST device 301 along the optical axis 333 (e.g., Fresnel or pancake lens) to correct for optical aberrations.

For example, while in VR mode the near-eye XR OST device 301 may have transparency of between 82.0-99.98%. While transparency of the microLED display 306 is disabled, by optical element 315, the transparent detector 308 continues to collect light focused by the meta-lens 314. The transparent sensor 308 sends signals to a processor to generate data (e.g., a topographical map of the surrounding environment). The display 306 may generate a virtual reality world for the observer 311 to perceive. In some embodiments, a one-directional pass-through coating is applied on a surface between the display 306 and the detector 308.

In some embodiments the transparent imaging sensor 308 may be a sensor comprising 8×8 pixels with each pixel measuring 60 μm×140 μm. For example, a 35×24 mm full frame sensor at this density would yield 0.1 MPixel (583× 171).

In some embodiments, the transparent display 306, the transparent image sensor 308, and the optical element 315 are electrically coupled to control circuitry and may be disposed in an opaque enclosure (e.g., 303). For example, control circuitry may change optical polarity disposed between two polarizers of optical element 315) to reduce transparency of the system. For example, the transparent detector captures images and sends associated electrical signal data to the control circuitry. The control circuitry analyzes the one or more electrical signals to determine localization of the real-world environment and objects 316. In some embodiments, the control circuitry may additionally utilize transparent detector(s), utilize video object tracking, artificial intelligence (AI) image recognition, spatial sound and/or spatial haptic feedback, or any suitable object detection technique or combination thereof to determine localization of the real-world environment and objects. For example, upon determining localization of the real-world environment and objects, the control circuitry my generate for display AR or VR images on the transparent display.

In some embodiments, the optical axis 333 of the XR device 301 may be understood to be the central axis passing through the optical center of the user's eye 311 and/or eye-box (a configured plane at which images projected by the display 306 may be ideally observed). The optical axis 333 extends through the transparent elements of the XR device 301 to the environment. When the device is in AR mode (e.g., OST), vision of the environment 316 is unobstructed by the device. When the device is in "Full VR mode" (e.g., VST), vision of the environment 316 to the user 311 is completely obstructed. In some embodiments, along the optical axis, there is a first opening of the enclosure 370 (e.g., bezel, opto-mechanical housing). In some embodiments, the optical axis 333 passes orthogonally through the planes of elements in the XR device 101, 201, 202, 302. In other embodiments, the optical axis 333 passes at an offset angle through the elements in the XR device.

In some embodiments, an aperture 310 configured to hold lens 305 is disposed in the opening 370 of the enclosure 306. In some embodiments, the eyepiece 305 is not required by the device. Along the optical axis 333 past the eyepiece 305 and within the enclosure 303, there is a display 306. In some embodiments, a second opening 380 in the enclosure is disposed along the optical axis 333. In some embodiments, a meta-lens 314 is disposed in the opening 380 of the enclosure 103, the meta-lens 314 focuses light onto a transparent display 308. In some embodiments, the distance of the meta-lens to the transparent display is based in-part on the focal length of the meta-lens 314. In some embodiments the transparent display 306 and the transparent detector 308 are separated by a distance. In some embodiments, the meta-lens 314 comprises multiple focal lengths that focus the image onto the detector and/or onto the focus screen.

In some embodiments, the meta-lens 314 provides an FOV not defined as wide (e.g., less than 120°). In other embodiments, optical see-through of the user is limited by either openings of the enclosure and/or aperture. In either case, it may be warranted to supplement the user's reduced vision with a virtual overlay around the perimeter of what the user can see, thereby combining OST with VST. In another embodiment, the meta-lens 314 images objects from the real-world environment onto the focus screen 307.

FIG. 4 is a flowchart of a process 400 for an XR OST device (e.g., 101, 201, 202, 301, 600 and 601 of FIG. 6, 706 of FIG. 7, etc.) switching and operating in different modes (e.g., AR mode and VR mode), in accordance with some embodiments of the disclosure. In various embodiments, the individual steps of process 400 may be implemented by one or more components of the devices, systems and methods of FIGS. 1-8 and may be performed in combination with any of the other processes and aspects described herein. Although the present disclosure may describe certain steps of process 400 (and of other processes described herein) as being implemented by certain components of the devices, systems and methods of FIGS. 1-8, this is for purposes of illustration only. It should be understood that other components of the devices, systems and methods of FIGS. 1-8 may implement those steps instead.

At 402, control circuitry (e.g., 217, 215, 604, 711, 811, etc.) may switch between AR and VR modes. For example, the control circuitry may switch between AR and VR modes 402 in response to a user of FIG. 1A requesting from a user input interface (e.g., 610) such as, for example, microphones, buttons, keypads, touchscreens, sensors, or any other components configured to receive user input or combinations thereof. For example, the control circuitry may switch between AR and VR modes 402 automatically in response to a determined safety concern from I/O circuitry (e.g., 215, 217, etc.), such as detecting a moving object or hazard approaching; an obstacle, object, or hazard in the direction of motion of the XR OST system; a sudden change of acceleration of the XR OST system; a high intensity light source, detecting a user biometric response (e.g., heartrate, eye gaze, eye twitching, seizure, loss of consciousness, etc.); XR OST system hazard (e.g., overheating, electrical shorting, network loss, etc.); prolonged use of the XR OST system hazard, or any other hazard; or any combination thereof. For example, the control circuitry may switch between AR and VR modes 402 in response to executing an XR application such as for gaming, education, entertainment, communication, marketing, retail, fitness, metaverse, navigation, tools, measurement, or any other AR/VR/XR application or combinations thereof. For example, the process 400 includes switching to a different mode 402, the modes including, at least, AR and VR. In some embodiments, process 400 may be executed by an internal computing processor unit (CPU). In some embodiments, process 400 may be executed by an external server (e.g., 704, edge computing device, cloud computation, etc.). For example, process 400 includes one or more functions performed to switch the XR OST device between different modes (e.g., AR mode, VR mode, etc.). If the mode is switched to AR mode, processing proceeds to 404, otherwise, processing may proceed to 414.

At 404, control circuitry of the XR OST device determines that AR mode is activated. Process 400 then continues to step 406.

At 406, the control circuitry deactivates the transparent display (e.g., 106 of FIG. 1, 206, 315, 306, 612, 806, etc.) to enable optical pass-through. For example, the transparent display may be a microLED display comprising the function of reduced transmission (e.g., an LCD screen or other optical component capable of changing polarization). For example, the control circuitry may turn off the transparent display or remove the VR display. Process 400 then continues to step 408.

At 408, input/output circuitries receive data from the transparent detector (e.g., 108, 208, 308, 808, etc.) and transparent display. In some embodiments, the process 400 includes receiving information from LiDAR, video object tracking, artificial intelligence (AI) image recognition, spatial sound and/or spatial haptic feedback, or any suitable object detection technique or combination thereof to determine localization of the real-world environment and objects. Process 400 then continues to step 410.

At 410, the control circuitry determines AR object positions based on the received data from the transparent detector and transparent display. For example, AR object positions may be determined through image processing to detect objects and or surfaces, and placement may be based, at least in part, on the object or surface location, orientation, accessibility, or other relevant parameter thereof. In some embodiments, the control circuitry may utilize a time multiplex scheme to control the states of the transparent display and transparent detector, analyze data from the transparent display and transparent detector and determine AR object positions, described in detail below. Process 400 then continues to step 412.

At 412, input/output circuitries generate for display on the transparent display AR images (e.g., 204, 804, etc.) in the determined positions. Process 400 then reverts to 402.

At 414, control circuitry of the XR OST device determines that VR mode is activated. Process 400 then continues to step 416.

At 416, control circuitry activates the transparent display to block out the external environment. In some embodiments, the darkening of the transparent display includes altering the polarization of the pixels in the LCD screen to block out light. Process 400 then continues to step 418.

At 418, input/output circuitry generates for display on the transparent display VR images. Process 400 then reverts to 402.

Figures 5A, 5B:
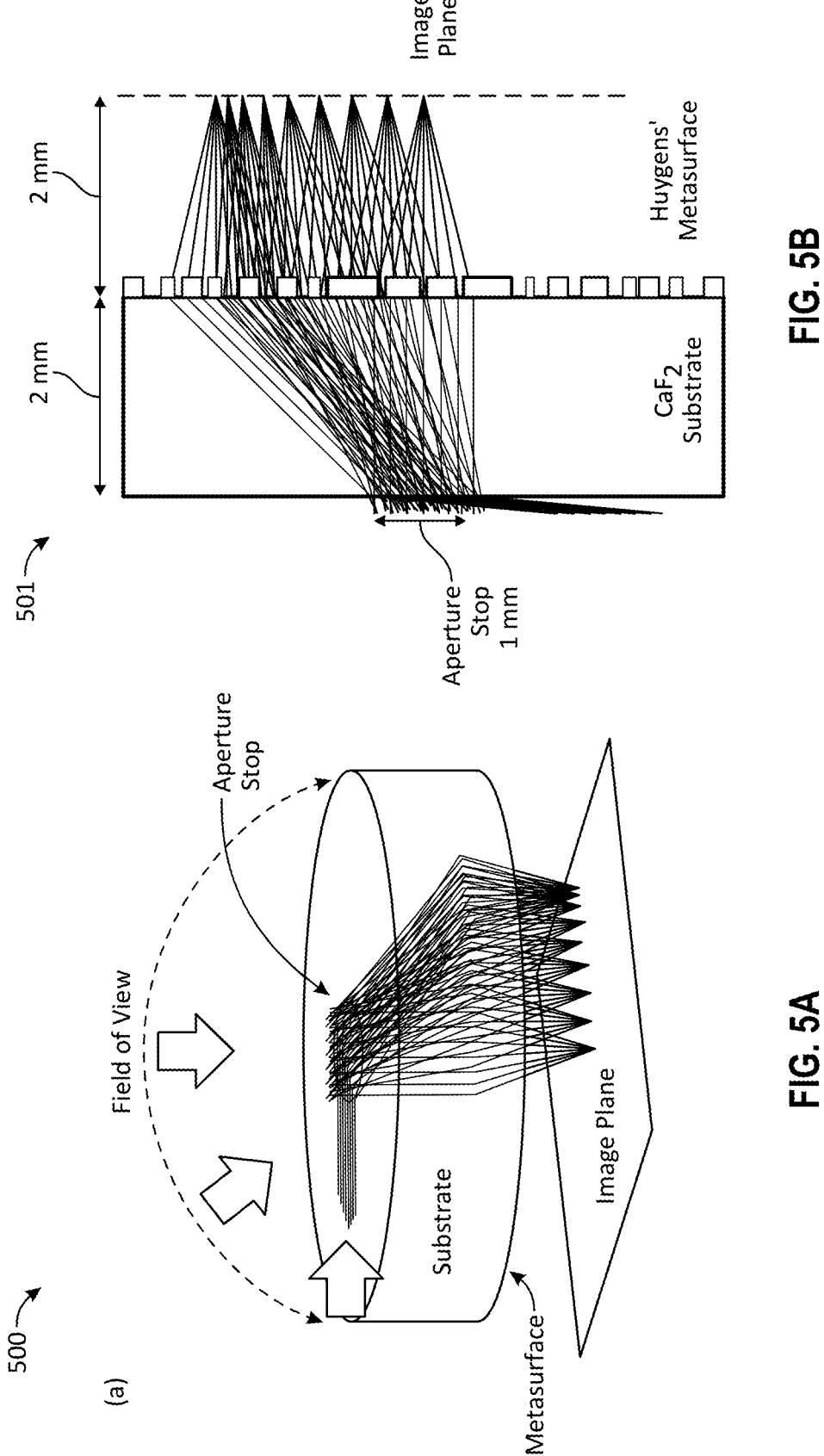
FIG. 5A depicts a 3D schematic of a meta-lens, in accordance with some embodiments of this disclosure.
FIG. 5B depicts a cross-sectional schematic of meta-lens FIG. 5A, in accordance with some embodiments of this disclosure.

FIG. 5A depicts a schematic for an example meta-lens. The schematic, in some instances, exemplifies the meta-lens depicted in FIGS. 1A-3, meta-lenses 114, 214, 314. In some embodiments, a meta-lens may be understood as a type of lens comprising nanoscale features to manipulate light in ways that traditional glass lenses cannot. Unlike conventional lenses, which rely on their curved shape and bulk material properties to direct light, meta-lenses utilize a flat surface embedded with nanostructures to achieve fine control over light paths at a much smaller scale.

FIG. 5B depicts a cross-section schematic for example meta-lens illustrated in FIG. 5A. The schematic, in some instances, exemplifies the meta-lens depicted in FIGS. 1A-3, meta-lenses 114, 214, 314. In some embodiments, a meta-lens may be understood as a type of lens comprising nanoscale features to manipulate light in ways that traditional glass lenses cannot. In some embodiments, the meta-lens may have a thickness of 2 mm. In some embodiments, a meta-lens may comprise $CaF_2$. In some embodiments, the meta-lens comprises an aperture stop of 1 mm in diameter. In some embodiments, the 2 mm thick meta-lens may focus light with Huygens' meta-surfaces at a 2 mm focal length. In some embodiments, the transparent imaging sensor of the XR device may be spaced 2 mm from the meta-lens.

FIGS. 6-7 describe illustrative devices, systems, servers, and related hardware for generating for display AR and VR images, in accordance with some embodiments of the present disclosure. FIG. 6 shows generalized embodiments of illustrative user equipment 600 and 601, which may correspond to, e.g., OST device 101 of FIG. 1B. For example, user equipment 600 may be a smartphone device, a tablet, a near-eye display device, an XR device, or any other suitable device capable of participating in an XR environment, e.g., locally or over a communication network. In another example, user equipment 601 may be a user television equipment system or device. User equipment 601 may include set-top box 615. Set-top box 615 may be communicatively connected to microphone 616, audio output equipment 614 (e.g., speaker or headphones), and display 612. In some embodiments, microphone 616 may receive audio corresponding to a voice of a user and/or ambient audio data. In some embodiments, display 612 may be a television display, OST display, or a computer display. In some embodiments, set-top box 615 may be communicatively connected to user input interface 610. In some embodiments, user input interface 610 may be a remote-control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 7. In some embodiments, user equipment 600 may comprise any suitable number of sensors (e.g., gyroscope or gyrometer, or accelerometer, etc.), and/or a GPS module (e.g., in communication with one or more servers and/or cell towers and/or satellites) to ascertain a location of user equipment 600. In some embodiments, user equipment 600 comprises a rechargeable battery that is configured to provide power to the components of the device.

Each one of user equipment 600 and user equipment 601 may receive content and data via input/output (I/O) path 602. I/O path 602 (e.g., an I/O circuitry for handling input and output signals) may provide content (e.g., broadcast programming, on-demand programming, internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 to one or more communications paths (described below). I/O functions may be provided by one or more of these communications paths but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., user equipment 600), an XR device, a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 604 executes instructions for the system (as described in connection with FIGS. 1-4 and 8) stored in memory (e.g., storage 608). Specifically, control circuitry 604 may be instructed by the system to perform the functions discussed above and below. In some implementations, processing or actions performed by control circuitry 604 may be based on instructions received from the system.

In client/server-based embodiments, control circuitry 604 may include communications circuitry suitable for communicating with a server or other networks or servers. The system may be a stand-alone application implemented on a device or a server. The application may be implemented as software or a set of executable instructions. The application may be the XR application described in FIG. 1. The instructions for performing any of the embodiments discussed herein of the application may be encoded on non-transitory computer-readable media (e.g., a hard drive, random-access memory on a dynamic random-access memory (DRAM) integrated circuit, read-only memory on a BLU-RAY disk, etc.). For example, in FIG. 6, the instructions may be stored in storage 608, and executed by control circuitry 604 of a user equipment 600.

In some embodiments, the application may be a client/server application where only the client application resides on user equipment 600, and a server application resides on an external server (e.g., server 704 and/or media content source 702). For example, the application may be implemented partially as a client application on control circuitry 604 of user equipment 600 and partially on server 704 as a server application running on control circuitry 711. Server 704 may be a part of a local area network with one or more of user equipment 600, 601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 704 and/or an edge computing device), referred to as "the cloud." User equipment 600 may be a cloud client that relies on the cloud computing capabilities from server 704 to generate personalized engagement options in a VR or AR environment.

Control circuitry 604 may include communications circuitry suitable for communicating with a server, edge computing systems and devices, a table or database server, or other networks or servers. The instructions for carrying out the above-mentioned functionality may be stored on a server (which is described in more detail in connection with FIG. 7). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 7). In addition, communications circuitry may include circuitry that enables peer-to-peer communication of user equipment, or communication of user equipment in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 608 may be used to store various types of content described herein as well as application data described above. Nonvolatile memory may also be used (e.g., to launch a boot-up routine and other instructions). Cloud-based storage, described in relation to FIG. 6, may be used to supplement storage 608 or instead of storage 608. Non-transitory memory may store instructions that, when executed by control circuitry, I/O circuitry, any other suitable circuitry or combination thereof, executes functions of an application as described above.

Control circuitry 604 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment 600, 601 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, sensor interface (e.g., to track body movement, eye gaze, biometric parameters, etc.), or other user input interfaces. Display 612 may be provided as a stand-alone device or integrated with other elements of each one of user equipment 600 and user equipment 601. For example, display 612 may be a touch-screen or touch-sensitive display. In such circumstances, user input interface 610 may be integrated with or combined with display 612. In some embodiments, user input interface 610 includes a remote-control device having one or more microphones, buttons, keypads, touchscreens, sensors, or any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, television, transparent display, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of user equipment 600 and user equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616, or audio output equipment 614 may include a microphone configured to receive audio input such as voice commands or speech. For example, a user may speak letters or words that are received by the microphone and converted to text by control circuitry 604. In a further example, a user may speak voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card. Camera 618 may be a transparent image sensor. For example, an OST device may use a transparent image sensor to capture a user's gestures, track a user's eye movements, or capture a user's facial expressions in relation to the VR or AR environment that are received by a transparent image sensor (or detector) and recognized by control circuitry 604.

In some embodiments, user equipment 601 may include biometric sensors, environmental sensors, motion sensors, depth sensors, gyroscopes, accelerometers, magnetometers, or any other suitable sensor or combination of such sensors (not shown). For example, an OST device may use a biometric sensor to capture a user's heart rate, speech pattern, galvanic skin response, brain waves, body posture, etc., in relation to the VR or AR environment that are received by a biometric sensor and recognized by control circuitry 604. For example, an OST device may use an environmental sensor to capture ambient noise, ambient temperature, ambient light (including at least, visible and infrared light), proximate objects, etc., in relation to the VR or AR environment that are received by an environmental sensor and recognized by control circuitry 604. For example, an OST device may use motion sensors, depth sensors, gyroscopes, accelerometers, and/or magnetometers to capture a user's movements, to track relationship aspects (such as direction, distance, etc.) within their actual environment, etc., in relation to the VR or AR environment that are received by a motion sensor, depth sensor, gyroscope, accelerometer, and/or magnetometer and recognized by control circuitry 604.

The application may be implemented using any suitable architecture. For example, it may be a stand-alone application wholly implemented on each one of user equipment 600 and user equipment 601. In such an approach, instructions of the application may be stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to provide video conferencing functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. In a further example, user gestures, eye movements, or facial expressions may be indicated by the processed instructions when user input interface 610 indicates that a user interacted with a VR or AR object. In a further example, user's biometrics, user's movements, environmental inputs, etc., may be indicated by the processed instructions when user input interface 610 indicates that a user interacted with a VR or AR object. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random-access memory (RAM), etc.

Control circuitry 604 may allow a user to provide user profile information or may automatically compile user profile information. For example, control circuitry 604 may access and monitor network data, video data, audio data, processing data, content consumption data, and/or any other suitable data being accessed by a first user (e.g., first user 100 of OST device 101). Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the application is a client/server-based application. Data for use by a thick or thin client implemented on each one of user equipment 600 and user equipment 601 may be retrieved on demand by issuing requests to a server remote from each one of user equipment 600 and user equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user equipment 600. This way, the processing of the instructions is performed remotely by the server while the resulting displays (e.g., that may include text, a keyboard, or other visuals) are provided locally on user equipment 600. User equipment 600 may receive inputs from the user via user input interface 610 and transmit those inputs to the remote server for processing and generating the corresponding displays. For example, user equipment 600 may transmit a communication to the remote server indicating that an up/down button was selected via user input interface 610. In a further example, user equipment 600 may transmit a communication to the remote server indicating that a user interacted with a VR or AR object via user input interface 610. The remote server may process instructions in accordance with that input and generate a display of the application corresponding to the input (e.g., a display that moves a cursor up/down). The generated display is then transmitted to user equipment 600 for presentation to the user.

In some embodiments, the application may be downloaded and interpreted or otherwise run by an interpreter or virtual machine (run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

As shown in FIG. 7, user equipment 706, 707, 708, 710 (which may correspond to user equipment, e.g., OST device 101 of FIG. 1A) may be coupled to communication network 709. Communication network 709 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 709.

System 700 may comprise media content source 702, one or more servers 704, and/or one or more edge computing devices. In some embodiments, the application may be executed at one or more of control circuitry 711 of server

704 (and/or control circuitry of user equipment 706, 707, 708, 710 and/or control circuitry of one or more edge computing devices). The application may be the XR application described in FIG. 1. In some embodiments, the media content source and/or server 704 may be configured to host or otherwise facilitate video communication sessions between user equipment 706, 707, 708, 710 and/or any other suitable user equipment, and/or host or otherwise be in communication (e.g., over communication network 709) with one or more social network services.

In some embodiments, server 704 may include control circuitry 711 and storage 714 (e.g., RAM, ROM, hard disk, removable disk, etc.). Storage 714 may store one or more databases. Server 704 may also include an I/O path 712. In some embodiments, I/O path 712 is an I/O circuitry. I/O circuitry may be a NIC card, audio output device, mouse, keyboard card, any other suitable I/O circuitry device or combination thereof. I/O path 712 may provide video conferencing data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711. Memory may store instruction to run the application.

FIG. 8 schematically illustrates XR OST system (e.g., 101, 201, 202, 301, etc.) capabilities for utilizing a time multiplex scheme 800. In some embodiments, control circuitry (e.g., 217, 215, 604, 711, 811, etc.) executes time multiplexing to capture a scene while operating in an AR mode (e.g., steps 406-410 of process 400). The time multiplexing may be executed as part of an application or as an independent operation. In one embodiment, control circuitry disables the transparency of the transparent display 806 to become opaque and/or display-ready so that light from the transparent display 806 does not propagate back to the transparent sensor 808. In some embodiments, the darkening of the transparent display includes altering the polarization of the pixels in the display to block out light. For example, for the duration of using a time multiplex scheme 800, a portion of time T1, shows the optical see-through and any AR object (e.g., 204, 804, etc.) while the transparent display 806 is transparent. For another portion of time T2, the control circuitry disables the transparency of the transparent display 806. These portions of time alter so that during times T$_n$, the transparent display 806 is at least in part transparent (e.g., T1, T3, T5, T7, etc.) and during times T$_{n+1}$, the transparent display 806 is disabled or filtered to prevent the transparent display light from propagate back to the transparent sensor (e.g., T2, T4, T6, T8, etc.).

In other embodiments, the transparency of the transparent display 806 is not disabled for any time point. For example, the control circuitry 811 analyzes data collected from all time points (e.g., T1, T2, T3, T4, etc.) and filters data based on the light from time series of data capture to remove noise from the light emitted from the transparent display during portions of time associated with sensor data used for analysis 821 (e.g., T2, T4, T6, T8, etc.)

In one embodiment, the transparent sensor 808 is disabled from capturing data during a portion of time T1 while the transparent display 806 is emitting light. The transparent sensor 808 is enabled to capture data during a portion of time T2 while the transparent display 806 is not emitting light. In other embodiments, the transparent sensor 808 collects data at all time points regardless of the state of the transparent display 806. For example, control circuitry 811 filters data collected from all time points (e.g., T1, T2, T3, T4, etc.) to remove portions of time while the transparent display 806 is at least in part transparent (e.g., T1, T3, T5, T7, etc.) to determine sensor data used for analysis 821 from portions of time while the transparent display 806 is not emitting light (e.g., T2, T4, T6, T8, etc.). In some embodiments, when a time multiplex scheme 800 is utilized, a one-directional pass-through coating applied on a surface between the display (e.g., 106, 206, 315, 306, 612, etc.) and the detector (e.g., 108, 208, 308, 808, etc.) is not required.

What is claimed is:

1. An extended reality (XR) apparatus comprising:
an opaque enclosure comprising a first face and a second face, wherein the first face and the second face are aligned along an axis;
a meta-lens disposed in an opening of the first face of the opaque enclosure, wherein focal length of the meta-lens extends along the axis;
a transparent light detector disposed, along the axis, between the meta-lens and the second face of the opaque enclosure, wherein the transparent light detector is disposed at a distance away from a back surface of the meta-lens, wherein the distance is based at least in part on the focal length of the meta-lens;
a transparent display disposed, along the axis, between the transparent light detector and the second face of the opaque enclosure;
an opening, along the axis, of the second face of the opaque enclosure; and
a control circuitry configured to:
analyze data produced by the transparent light detector based on light travelling through the meta-lens; and
generate for display on the transparent display, at least one AR object, in a location based at least in part on analyzing the data produced by the transparent light detector.

2. The XR apparatus of claim 1, further comprising:
an eyepiece lens disposed in the opening of the second face of the opaque enclosure.

3. The XR apparatus of claim 1, wherein the control circuitry is further configured to generate for display the at least one AR object by:
intermittently, at a particular frequency, generating for display the at least one AR object;
wherein the control circuitry is further configured to analyze the data produced by the transparent light detector by:

analyzing data produced by the transparent light detector at intermittent time periods during which the at least one AR object is not generated for display.

4. An extended reality (XR) apparatus comprising:

an opaque enclosure comprising a first face and a second face, wherein the first face and the second face are aligned along an axis;

a meta-lens disposed in an opening of the first face of the opaque enclosure, wherein focal length of the meta-lens extends along the axis;

a transparent light detector disposed, along the axis, between the meta-lens and the second face of the opaque enclosure, wherein the transparent light detector is disposed at a distance away from a back surface of the meta-lens, wherein the distance is based at least in part on the focal length of the meta-lens;

a transparent display disposed, along the axis, between the transparent light detector and the second face of the opaque enclosure, wherein the transparent display further comprises a transparent liquid crystal display (LCD) screen disposed between the transparent display and the transparent light detector, wherein the LCD screen comprises at least two optical elements communicatively coupled to the LCD; and an opening, along the axis, of the second face of the opaque enclosure.

5. The XR apparatus of claim 4 further comprising, wherein the two optical elements are a first polarizer and a second polarizer disposed front and back surfaces of the LCD screen:

a control circuitry configured to:

change the polarization of the LCD screen disposed between the first and the second polarizers wherein the change in polarization relates to the transparency of the display.

6. The XR apparatus of claim 4, further comprising:

a control circuitry configured to, based on a request to activate a VR mode:

adjust polarization of the LCD screen to adjust transparency of the LCD screen; and generate for display at least one VR image on the transparent display.

7. The XR apparatus of claim 1, further comprising at least one ranging device disposed on an outer surface of the opaque enclosure.

8. The XR apparatus of claim 7, wherein the control circuitry is further configured to:

emit a light onto an environment, wherein the light is emitted from the at least one ranging device disposed on the outer surface of the opaque enclosure;

collect the light reflected from the environment;

convert the collected light to a plurality of datapoints, wherein the plurality of datapoints relate to spatial distances of the environment; and analyze the plurality of data points to determine spatial properties of the environment to the XR apparatus.

9. The XR apparatus of claim 1, further comprising at least one external light detector disposed on an outer surface of the opaque enclosure.

10. The XR apparatus of claim 9, wherein the control circuitry is further configured to:

analyze data produced by an at least one camera;

analyze data produced by the transparent light detector based on light travelling through the meta-lens; and generate for display on the transparent display, at least one AR object, in a location based at least in part on: (a) the analyzing the data produced by the at least one camera, and (b) the analyzing the data produced by the transparent light detector.

11. The XR apparatus of claim 1, further comprising a focus screen disposed between the transparent light detector and the transparent display.

12. The XR apparatus of claim 1, wherein the meta-lens is a first meta-lens, the apparatus further comprising:

an optical element to invert light traveling through the meta-lens.

13. The XR apparatus of claim 7, wherein the control circuitry is further configured to:

emit a light onto an environment, wherein the light is emitted from the at least one ranging device disposed on the outer surface of the opaque enclosure;

collect the light reflected from the environment;

convert the collected light to a plurality of datapoints, wherein the plurality of datapoints relate to spatial distances of the environment; and analyze the plurality of data points to determine spatial properties of the environment to the XR apparatus.

14. The XR apparatus of claim 11, wherein the focus screen disposed between the transparent light detector and the transparent display is at a distance away from the meta-lens along an optical axis, wherein the distance is defined in-part on the focal length of the meta-lens.

15. The XR apparatus of claim 12, wherein the first meta-lens and second meta-lens are optically coupled to produce an image on a focus screen.

16. The XR apparatus of claim 1, further comprising an external sensor disposed on the opaque enclosure configured to collect amplitude and phase of light emitted from an environment.

17. The XR apparatus of claim 16, wherein the control circuitry is further configured to:

collect phase and amplitude data from a real-world environment; and analyze the collected phase and amplitude to determine a plurality of data points related to a detected object in the real-world environment, wherein the data points relate to a distance of the detected object.

18. The XR apparatus of claim 17, wherein the control circuitry is further configured to:

convert the data points related to the distance of the detected object to be utilized on the transparent display;

correlate the converted data points to pixels on the transparent display; and generate for display an AR object, wherein pixels of the AR object relate to the distance of the detected object.

19. A method performed in a system that comprises:

an opaque enclosure comprising a first face and a second face, wherein the first face and the second face are aligned along an axis;

a meta-lens disposed in an opening of the first face of the opaque enclosure, wherein focal length of the meta-lens extends along the axis;

a transparent light detector disposed, along the axis, between the meta-lens and the second face of the opaque enclosure, wherein the transparent light detector is disposed at a distance away from a back surface of the meta-lens, wherein the distance is based at least in part on the focal length of the meta-lens;

a transparent display disposed, along the axis, between the transparent light detector and the second face of the opaque enclosure; and an opening, along the axis, of the second face of the opaque enclosure;

the method comprising:

analyzing, using a control circuitry, data produced by the transparent light detector based on light travelling through the meta-lens; and generating for display, using the control circuitry, on the transparent display, at least one AR object, in a location based at least in part on the analyzing the data produced by the transparent light detector.

\* \* \* \* \*